United States Patent [19]

Remery et al.

[11] Patent Number: 4,822,984
[45] Date of Patent: Apr. 18, 1989

[54] PROCESS FOR ELECTRONIC PAYMENT USING A MEMORY

[76] Inventors: Patrick Remery, 8 Avenue de la lére Armée Francaise, 14000 Caen, France; Jean-Pierre Boule, 12 Rue de la Résistance Soliers, 14540 Bourguebus, France

[21] Appl. No.: 936,775
[22] Filed: Dec. 2, 1986

[30] Foreign Application Priority Data

Dec. 2, 1985 [FR] France ................... 85 17778

[51] Int. Cl.$^4$ .......................... G06K 5/00; G07F 7/08
[52] U.S. Cl. ..................................... 235/375; 235/380; 235/494
[58] Field of Search ... 364/200 MS File, 900 MS File; 235/379, 380, 492, 494, 487, 488, 381, 375

[56] References Cited

U.S. PATENT DOCUMENTS

| | | | |
|---|---|---|---|
| 4,001,550 | 1/1977 | Schatz | 235/61.7 B |
| 4,204,113 | 5/1980 | Giraud et al. | 235/375 |
| 4,256,955 | 3/1981 | Giraud et al. | 235/380 |
| 4,367,402 | 1/1983 | Giraud et al. | 235/385 |

Primary Examiner—Eddie P. Chan
Assistant Examiner—Michael A. Jaffe
Attorney, Agent, or Firm—Oblon, Fisher, Spivak, McClelland & Maier

[57] ABSTRACT

Electronic payment method wherein a memory is used with two zones of equal capacity, a payment zone and a reloading zone. A stop-bit equal to "0" is written in the payment zone. A first payment of a certain amount is obtained by counting an amount equal to the payment of "1's" in the payment zone starting from the first bit in the memory. A "0" is written accordingly. A second payment of any other amount is obtained by counting another amount of "1's" equal to the new payment starting from the preceeding "0" and a "0" is written and so on until the rank of the bit to be written as "0" in the payment zone overshoots the rank of the stop-bit in the reloading zone. For a reloading operation a "0" is written in the reloading zone for all bits having the same rank as the "0" bits in the payment zone and a new stop-bit is determined and this is set equal to "0" by writing in the reloading zone.

8 Claims, 1 Drawing Sheet

```
ZP      1  1  1  1  1  1 ..... 1  1  1  1  1 .... 1

ZR      1  1  1  1  1  1 ..... 1  1  1  1  1 .... 1

P1       BG1
               ┌─────┐    ↙
ZP      1  1  1  0  1  1 ..... 1  1  1  1  1 .... 1

ZR      1  1  1  1  1  1 ..... 1  1  1  0  1 .... 1
```

| ZP | 1 | 1 | 1 | 1 | 1 | 1 | ..... | 1 | 1 | 1 | 1 | 1 | ....1 |
| ZR | 1 | 1 | 1 | 1 | 1 | 1 | ..... | 1 | 1 | 1 | 1 | 1 | ....1 |

| ZP | 1 | 1 | 1 | 1 | 1 | 1 | ..... | 1 | 1 | 1 | 1 | 1 | ... 1 |
| ZR | 1 | 1 | 1 | 1 | 1 | 1 | ..... | 1 | 1 | 1 | 0 | 1 | ... 1 |

BB1

P1    BG1

| ZP | 1 | 1 | 1 | 0 | 1 | 1 | ..... | 1 | 1 | 1 | 1 | 1 | ....1 |
| ZR | 1 | 1 | 1 | 1 | 1 | 1 | ..... | 1 | 1 | 1 | 0 | 1 | ....1 |

P2    BG2

| ZP | 1 | 1 | 1 | 0 | 1 | 1 | ..... | 1 | 0 | 1 | 1 | 1 | ... 1 |
| ZR | 1 | 1 | 1 | 1 | 1 | 1 | ..... | 1 | 1 | 1 | 0 | 1 |     1 |

MR

| ZP | 1 | 1 | 1 | 0 | 1 | 1 | ..... | 1 | 0 | 1 | 1 | 1 | ...1 |
| ZR | 1 | 1 | 1 | 1 | 1 | 1 | ..... | 1 | 1 | 1 | 0 | 1 | ...1 |

| ZP | 1 | 1 | 1 | 0 | 1 | 1 | ..... | 1 | 0 | 1 | 1 | 1 | 1 | 1..1 |
| ZR | 1 | 1 | 1 | 1 | 1 | 1 | ..... | 1 | 1 | 1 | 0 | 1 | 1 | 1  1 |

SV                              MR

| ZP | 1 | 1 | 1 | 0 | 1 | 1 | ..... | 1 | 0 | 1 | 0 | 1 | 1 | 1..1 |
| ZR | 1 | 1 | 1 | 0 | 1 | 1 | ..... | 1 | 0 | 1 | 0 | 1 | 1 | 1..1 |

| ZP | 1 | 1 | 1 | 0 | 1 | 1 | ..... | 1 | 0 | 1 | 0 | 1 | 1 | 1..1 |
| ZR | 1 | 1 | 1 | 0 | 1 | 1 |       | 1 | 0 | 1 | 0 | 1 | 1 | 0..1 |

BB2

PROCESS FOR ELECTRONIC PAYMENT USING A MEMORY

BACKGROUND OF THE INVENTION

The present invention relates to an electronic payment process using a memory.

FIELD OF THE INVENTION

The existing operation of systems for the electronic payment of small sums consists of the use of smart cards called "token holders".

It is known that the smart card is a plastic support with dimensions corresponding to ISO standards 2894 and 3554. This support carries an electronic component containing a microprocessor, which contains a data memory with several hundred bits produced in EPROM technology, i.e. using an electrically programmable read only memory.

The processing performed in the token holder smart card consists of making a payment unit or "token" correspond to each bit of a zone of the data memory. A point of sale terminal equipped with a card reader performs a transaction by "lacing" bits into the data memory. This "lacing" of a bit consists of electrically passing one memory bit from binary state 1 corresponding to the credit of one unit to binary state 0 corresponding to a zero credit. As this data memory is produced in EPROM technology, this change of state is electrically irreversible.

However, this system suffers from disadvantages, namely it is not possible to reload the card and there is also a high bit consumption, the number of laced bits being equal to the number of units to be dispensed.

SUMMARY OF THE INVENTION

The object of the invention is to obviate these disadvantages. For this purpose, the memory is subdivided into two equal capacity zones. The physical and logical structure of the memory makes it possible to associate a rank or order with each bit. Two bits are said to be homologous if they have the same rank in two zones. They form a pair designated (x, y) in which x is the binary value (0 or 1) of the bit of the first zone, called the payment zone and in which y is the binary value of the bit of the second zone or reloading zone. According to the invention the credit available in the card is expressed in units, the number of available units being equal to the number of pairs (1, 1), whose rank exceeds 1 or the rank of the highest rank pair (0, 1), if such a pair (0, 1) exists and is lower than the rank of a predetermined limit pair.

According to a first variant, this predetermined pair limiting the number of available units is the last pair (1, 1) of the memory. In other words the available credit is limited by the memory capacity.

According to a second variant the predetermined pair limiting the number of available units is a stop pair (1, 0) obtained by entering a 0 in the reloading zone.

Finally, according to a third variant the predetermined pair limiting the number of available units is the highest rank pair from among the stop pairs (1, 0).

According to the invention, for performing an operation of debiting the card p units, a single bit is laced into the payment zone according to the following procedure:

the pair (0, 1) of highest rank $r_0$ is sought, the pth pair (1, 1) of rank $r_p$ higher than $r_0$ is sought, the bit of rank $r_p$ is laced into the payment zone if said rank is below the rank of the limit pair, which is defined in accordance with the three aforementioned variants.

To carry out a card credit operation, bits are laced into the reloading zone to cancel out preceding debit operations passing the pairs (0, 1) to the state (0, 0), said pairs being subsequently ignored.

To limit the credit reloaded into the card, it is possible to pass a pair (1, 1) to state (1, 0), stop pair, without cancelling out or while cancelling out the preceding stop pairs, i.e. by passing a stop pair (1, 0) to the subsequently ignored state (0, 0). If the stop pairs are not used, it is possible to limit the reloaded credit by a fictional payment by passing a pair (1, 1) to state (0, 1).

Compared with the prior art (token holder), the consumption of bits is reduced when the average payment exceeds two units. Thus, a payment involves the lacing of a bit into the payment zone and the reuse of unused pairs involves the lacing of the homologous bit into the reloading zone, i.e. two bits in all.

Thus, during reloading the limitation of the reloaded sum leads to the lacing of supplementary bits. In practice, it can be considered that the number of laced bits per operation is between 2 and 3.

BRIEF DESCRIPTION OF THE DRAWINGS

The characteristics of the invention can be better gathered from the following description of an exemplified embodiment and with reference to the attached drawings, wherein show.

DETAILED DESCRIPTION OF THE INVENTION

Figures 1, 2, 3, 4, 5, 6, 7, 8:
FIG. 1, the initial state of the memory.
FIG. 2, the entry of a stop into the loading zone.
FIG. 3, a first payment operation.
FIG. 4, a second payment operation.
FIG. 5, the state of the memory at the end of first use.
FIG. 6, the operation of determining the amount to be reloaded into a card.
FIG. 7, the operation of placing pairs (0, 1) and (1, 0) at (0, 0) during reloading.
FIG. 8, the state of the memory after entering a new stop (1, 0).

The invention can be carried out with a large number of memory types, such as electronic memories, e.g. EPROM or EEPROM, with irreversible or non-irreversible transformation, magnetic memories, etc.

The memory used can be one of the components of a card, of the credit card type, or can be one of the components of a more complex electronic circuit.

With regards to the information bits contained in said memory, it is obvious that the designation by 1 or 0 of said bits is of a non-limitative nature. It merely consists of a notation making it possible to characterize a first or second logic state.

The following description will refer to the case where the memory is of the EPROM type, which makes it possible to irreversibly lace bits from state 1 to state 0, but this example is not limitative.

The following description will refer to the variant where the available credit is limited by a single stop pair (1, 0).

The initial state of the memory with its payment ZP and reloading ZR zones is represented in FIG. 1, where all the bits are at 1. A bit at 0 in the reloading zone ZR defines a stop BB1, as shown in FIG. 2.

A first transaction for an amount P1 is performed by a point of sale terminal into which the card is introduced by counting, from the start of zone ZP, a number of 1 equal to P1 (here P1=4). This count defines the bit to be laced BG1, which is placed at 0 (FIG. 3).

A second transaction corresponding to the payment of an amount P2 is obtained by lacing bit BG2 at P2 positions of BG1 (FIG. 4).

These payments are possible because the rank of the bit placed at 0 is below the rank of stop BB1. However, the transaction is impossible as soon as the rank $r_p$ of the bit to be laced exceeds the rank of the stop pair.

In practice, the reloading zone is protected. When the card is introduced into a point of sale terminal, the latter only has access to payment zone ZP by means of a first code and can only lace the bits of said zone. Only the organisation supplying the card is authorised to lace bits into reloading zone ZR. Thus, these reloading operations take place by introducing the card into a special terminal, which is a loading terminal. This protection is obtained by using a code known only by the reloading terminal. This terminal firstly calculates the residual amount MR on the card. This consists of the number of pairs (1, 1) left between the final pair (0, 1) and the pair defining the stop (1, 0)—FIG. 5. It then calculates the new amount to be reloaded, i.e. the sum of the residual amount MR and the sum deposited SV by the card owner. The terminal then seeks the stop bit to be laced. For this purpose it counts from the state of the zones, a number of pairs (1, 1) equal to the amount to be reloaded SV+MR (FIG. 6). The pairs at state (1, 0), (0, 1) and (0, 0) are ignored in this count. If the number of pairs at state (1, 1) is below the amount to be reloaded, plus 1, the operation is impossible. The preceding reloading is reset by passing all the pairs (1, 0) and (0, 1) to state (0, 0)—FIG. 7. These pairs (0, 0) will be ignored throughout the remainder of the subsequent operations. Finally, the terminal laces bit BB2, which defines the new stop (FIG. 8).

For example, it is possible to use fifty word—32 bit memories, whereof 28 are useful (4 bits are reserved for the card operating system). The sizes of the payment and reloading zones are consequently 50*14=700 bits. As the number of laced bits per payment is 1, the theoretical number of payments is 700. It is in fact below this figure, because the laced bits for defining the stops and the bits remaining at the end of validity of the card are lost. More specifically, it is possible to take the example of a constant minimum reloading of 100 units and average payments of 10 units. Thus, there are 100 bits unusable because their number does not permit reloading, so that only 545 payments can be made, giving an average consumption of 2.56 bits per operation. The total amount of these payments thus rises to 545*10=5450 units.

If it is wished to improve the accuracy of the payments by multiplying by 2 the number of bits counted per payment, i.e. 20 units, the reloadings would be 200 units. The number of payments would then be 455 giving an average consumption of 3.07 bits per operation. The total amount of the payments would be 455*20=9100 units. Thus, the precision on the units is doubled to the detriment of the total number of payment reduced by 20%.

The invention provides specific protections with respect to possible illegal acts on the part of the card owner attempting to conceal payments or effect illicit reloadings. In this connection the following points are stressed. The reading of the payment and reloading zones is free. The entry of 0 into the loading zone is only possible by presenting a code, any passage of the pairs from state (1, 1) and (0, 1) to state (1, 0) or (0, 0) is impossible without providing the card with a code held solely by the card issuing organisation. The entry of a 0 into the payment zone has the effect of passing pair (1, 1) to (0, 1). It has no effect on the amount available in the card if carried out on the pairs preceding the final pair in state (0, 1) or located following the stop pair in state (1, 0). It has the effect of adding fictional payments to the card if carried out on pairs located between the final pair in state (0, 1) and the stop pair in state (1, 0). For the stop pair in state (1, 0), the passage to state (0, 0) would have the effect of making the card invalid, because no stop would appear at the next payment.

Therefore an illegal entry into the payment zone never leads to credit being produced. The card can only be credited by entries in the reloading zone under the control of the code held by the issuing organisation.

We claim:

1. An electronic payment method representative of credits in a memory comprising the steps of:
    writing in the memory a first set of 1 bits into a first zone denominated as a payment zone and an identical set of 1 bits in a second zone denominated as a reloading zone, said first and second zones having each a first bit and a last bit, with bits having a rank denominated from a first rank for the first bit to a last rank for the last bit,
    writing in said reloading zone a 0 in place of a 1, for obtaining an end point indicated as a first stop-bit, said first stop-bit having a given rank,
    a first counting step for a first payment operation, of a first amount in said payment zone from said first bit an amount of bits equal to 1, to a second bit having a second rank, equal to the rank of said first bit plus a number of bits indicative of said first amount,
    checking whether said second rank of said second bit is not larger than said rank of said first stop-bit, and if so changing said second bit from 1 to 0,
    a second counting step for a second payment operation, of a second amount, in said payment zone, from said second bit, which has been set equal to 0 after said first payment operation, a second amount of bits equal to 1, which gives a third bit having a third rank, checking whether said third rank of said third bit is not larger than said rank of said stop-bit, and if so changing said third bit from a 1 to 0,
    and repeating said second counting step until said rank of said stop-bit is exceeded by the count.

2. An electronic payment method according to claim 1, further comprising:
    a first crediting operation wherein said first crediting operation comprises the steps of:
    writing into said reloading zone a 0 in place of a 1, for each bit having a same rank as a 0 bit, in said payment zone,
    writing into said payment zone a 0 instead of a 1, for a bit having the same rank as the rank of the stop-bit which is last in said reloading zone,
    writing in said reloading zone a 0 instead of a 1 at a point equal to the amount to be credited thereby obtaining a new stop-bit.

3. An electronic payment method according to claim 2, comprising further the steps of:

counting for a payment operation, an amount after said first crediting operation, in said payment zone from said first bit an amount of bits equal to 1 while ignoring any bits equal to 0, which gives a check bit having a rank, and checking whether said rank of said check bit is not larger than said rank of said new stop-bit written by said first crediting operation, and if so changing said bit from 1 to 0, second payment counting step for any subsequent payment operation, of a subsequent amount, after said first crediting operation, in said payment zone, from said check bit, a second amount of bits equal to 1 ignoring the bits equal to 0, which gives a new check bit having a given rank, checking whether said rank of said check bit is not larger than said rank of said new stop-bit written by said first crediting operation, and if so changing said bit from 1 to 0, and repeating said second payment counting operation until said rank of said new stop-bit is exceeded by said count.

4. An electronic payment method according to claim 3 further comprising:

a second crediting operation wherein said second crediting operation comprises the steps of:

writing into said reloading zone a 0 instead of a 1, for each bit having a same rank as 0 bits written in said payment zone, writing into said payment zone a 0 instead of a 1, for the bit which has the same rank as the rank of the new stop-bit in said reloading zone, writing in said reloading zone a 0 instead of a 1 at a point equal to the amount to be credited thereby for obtaining a new stop-bit.

5. An electronic payment method according to claim 4, comprising further the steps of:

counting for a first payment operation after a nth crediting operation, wherein n is an integer greater than 2, a first payment consisting of a first amount, in said payment zone from said first bit said first amount of bits equal to 1 ignoring bits equal to 0, which gives a nth bit having a nth rank, checking whether said nth rank of said nth bit is not larger than the rank of the new stop-bit written by said nth crediting operation, and if so changing said nth bit from 1 to 0, second counting step for any subsequent payment operation of a given amount, counting in said payment zone, from said nth bit said given amount of bits equal to 1, ignoring the bits equal to 0, which gives a (n+1)th bit having a (n+1)th rank, checking whether said (n+1)th rank of said (n+1)th bit is not larger than the rank of said new stop-bit written through said nth crediting operation, and if so changing said (n+1)th bit from 1 to 0, and repeating said second counting step until said rank of said new stop-bit is exceeded.

6. An electronic payment method according to claim 5, further comprising a (n+1)th crediting operation wherein said (n+1)th crediting operation comprises the steps of:

writing into said reloading zone a 0 in place of a 1 for each bit equal to 1 having a same rank as a 0 bit written in said payment zone, writing into said payment zone a 0 in place of a 1 for a bit having the same rank as the rank of the new stop-bit in said reloading zone, writing into said reloading zone a 0 in place of a 1 for obtaining a new stop-bit.

7. An electronic payment method according to any one of claims 1 to 6, wherein any writing operation in said payment zone of said memory comprises the steps of:

presenting a first code, comparing this code with a first confidential code, and allowing the writing only if the code presented is identical to said first confidential code.

8. An electronic payment method according to any of claims 1 to 6, wherein any writing operation in said reloading zone of said memory comprises the steps of:

presenting a second code, comparing this code with a second confidential code, and allowing the writing if the code presented is identical to said second confidential code.

* * * * *